(12) United States Patent
Vian

(10) Patent No.: US 6,290,254 B1
(45) Date of Patent: *Sep. 18, 2001

(54) STEERING WHEEL

(75) Inventor: Paolo Vian, Tregnago (IT)

(73) Assignee: Breed Automotive Technology, Inc., Lakeland, FL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 8 days.

This patent is subject to a terminal disclaimer.

(21) Appl. No.: 09/280,239

(22) Filed: Mar. 29, 1999

(30) Foreign Application Priority Data

May 22, 1998 (IT) ................................................ MI98U0367

(51) Int. Cl.[7] ................................. B62D 1/04; B60R 21/16
(52) U.S. Cl. ................................................ 280/731; 74/552
(58) Field of Search ............................... 74/552, 553, 882, 74/443 R, 558; 280/731, 736, 728.1, 728.2, 741, 735; 200/61.54

(56) References Cited

U.S. PATENT DOCUMENTS

| | | | |
|---|---|---|---|
| 3,827,715 | * | 8/1974 | Lynch ................................. 280/731 |
| 3,895,823 | * | 7/1975 | Stephenson ........................ 280/731 |
| 5,149,127 | * | 9/1992 | Manabe et al. ..................... 280/731 |
| 5,267,486 | * | 12/1993 | Niwa et al. .......................... 74/552 |
| 5,331,125 | * | 7/1994 | Wenstein ......................... 200/61.54 |
| 5,678,851 | * | 10/1997 | Saito et al. ...................... 280/731 X |
| 5,685,557 | * | 11/1997 | Persson et al. ................... 74/552 X |

FOREIGN PATENT DOCUMENTS

2309123 * 7/1997 (GB) .

* cited by examiner

Primary Examiner—David A. Bucci
Assistant Examiner—Marcus Charles
(74) Attorney, Agent, or Firm—Lonnie Drayer

(57) ABSTRACT

A steering wheel is provided with an airbag. The steering wheel has a central part for connection to a steering wheel attachment and a cavity for housing a module. The module includes an airbag and a horn. The steering wheel has an outer ring and a plurality of substantially radial spokes connecting the outer ring to the central part of the steering wheel. The spokes are covered with a first metal sheet integral therewith so as to give the steering wheel a sporting appearance.

12 Claims, 4 Drawing Sheets ic # STEERING WHEEL

FIELD OF THE INVENTION

This invention relates to a motor vehicle steering wheel of sporting appearance equipped with an airbag.

BACKGROUND OF THE INVENTION

The use of airbag devices for protecting the chest of motor vehicle drivers in the event of a crash is now widespread.

The increasing use of airbags has created a problem for steering wheel manufacturers, in particular with those intended for sporting vehicles, because the inclusion of the airbag device in steering wheels has caused the steering wheels to lose their sporting appearance and the customers for these vehicles are not pleased with this.

SUMMARY OF THE INVENTION

It is an object of this invention to provide a steering wheel of sporting appearance with an airbag.

According to this invention this object is achieved by a motor vehicle steering wheel provided with an airbag comprising a central part for connection to a steering wheel attachment, having a cavity housing a module comprising the airbag safety device and a horn, an outer ring and a plurality of substantially radial spokes connecting the outer ring to the central part of the steering wheel, characterized in that the plurality of spokes is covered with a first metal sheet which is integral therewith so as to give the steering wheel a sporting appearance.

BRIEF DESCRIPTION OF THE DRAWINGS

The characteristics of this invention will be obvious from the following detailed description of an embodiment and its variants illustrated by way of non-limiting examples in the appended drawings, in which.

DETAILED DESCRIPTION OF THE INVENTION

Figure 1:
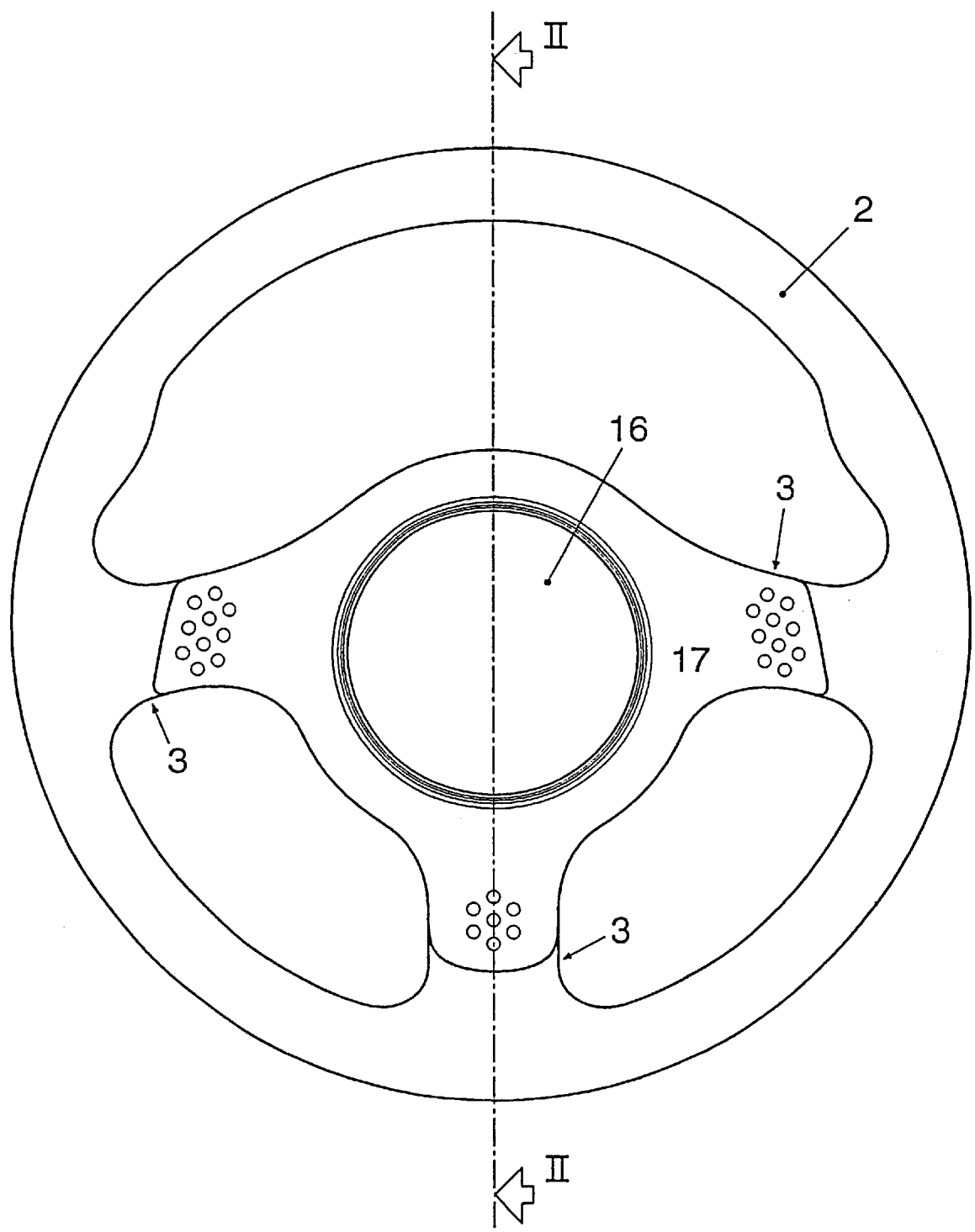
FIG. 1 shows the steering wheel according to the invention in plan from above.
Figure 2:
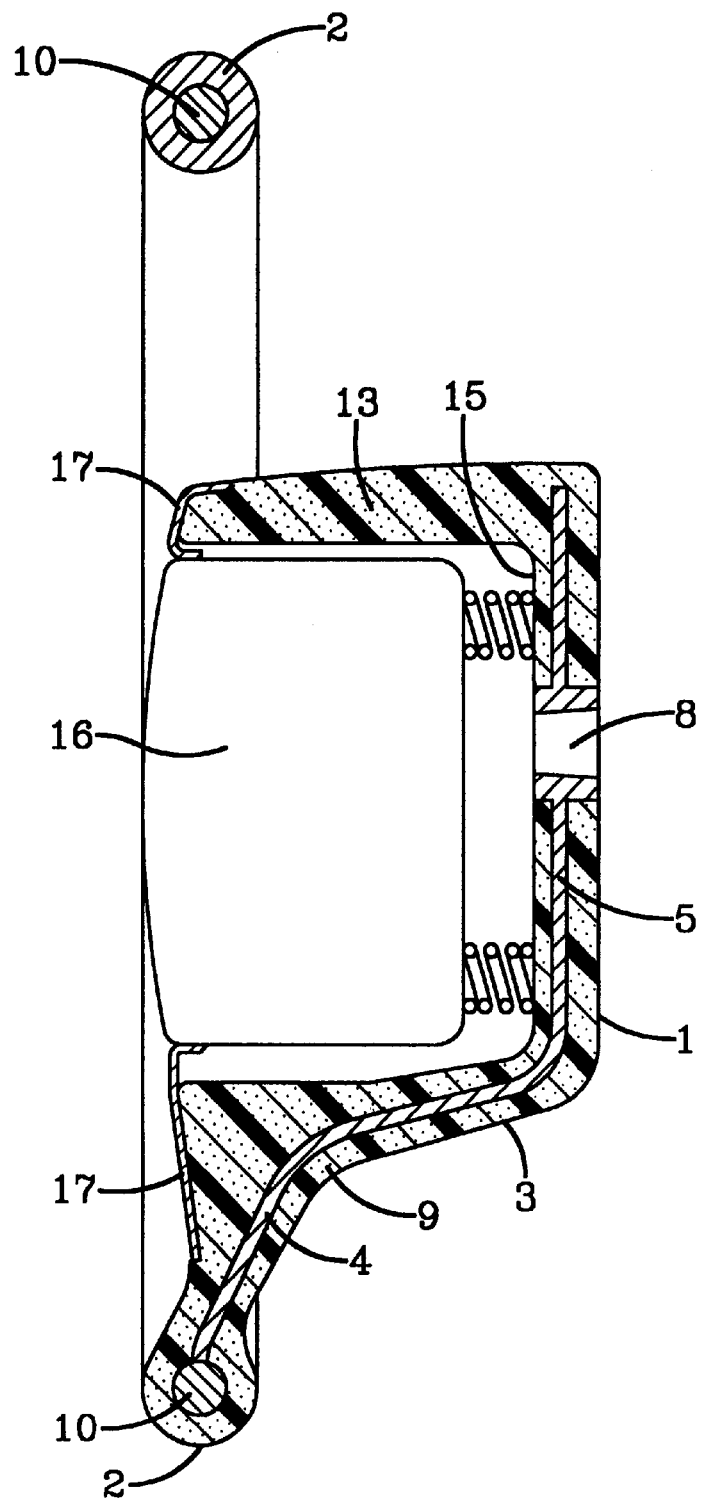
FIG. 2 shows the abovementioned steering wheel in cross-section along the line II—II in FIG. 1.

FIGS. 1 and 2 show a steering wheel essentially comprising a central part 1, an outer ring 2 and three substantially radial spokes 3 connecting the central part 1 and the ring 2.

The spokes 3 have internal thin metal cores 4 which branch out from an internal metal core 10 in the ring 2 and are connected together by a metal plate 5 (FIG. 2) which is axially displaced with respect to the ring 2 so as to form a cavity 15 which is used as a space to house a removable module 16 comprising an airbag and a horn.

The plate 5 has a central hole 8 (FIG. 2) for rotational coupling to a corresponding terminal portion of a motor vehicle steering column. A covering 9 of polyurethane or the like made as a single piece covers the ring 2, the spokes 3 and the plate 5, also forming arched projections 13 laterally bounding the cavity 15.

In order to confer a sporting appearance upon the steering wheel, the spokes 3 are further covered with a sheet of metal material 17, typically aluminum, from the area surrounding the module 16 to the vicinity of their attachment to the ring 2 (FIG. 1).

Figure 3:
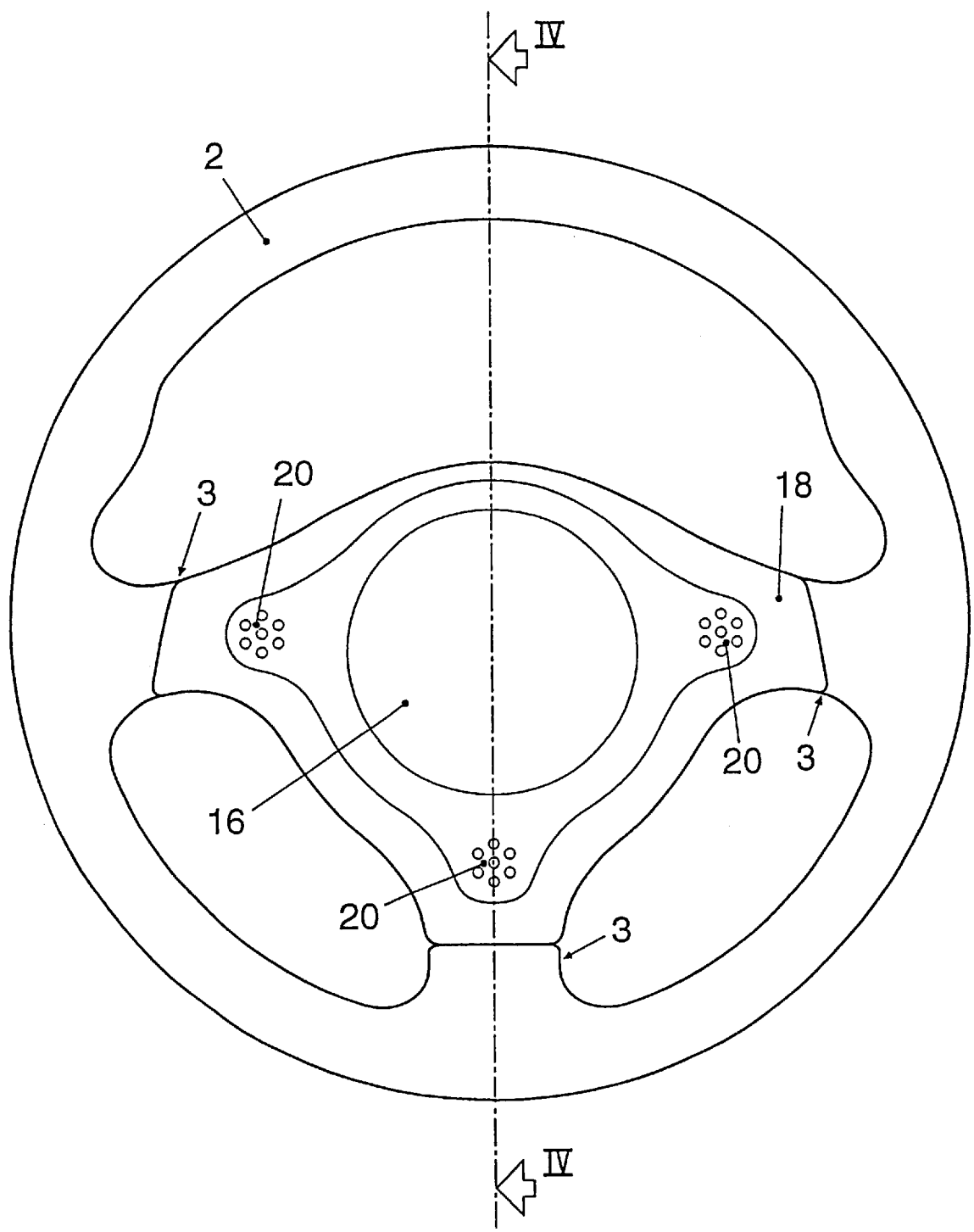
FIG. 3 shows a variant of the steering wheel according to the invention in plan from above; and, FIG. 4 shows the aforesaid steering wheel in cross-section along the line IV—IV in FIG. 3.
Figure 4:
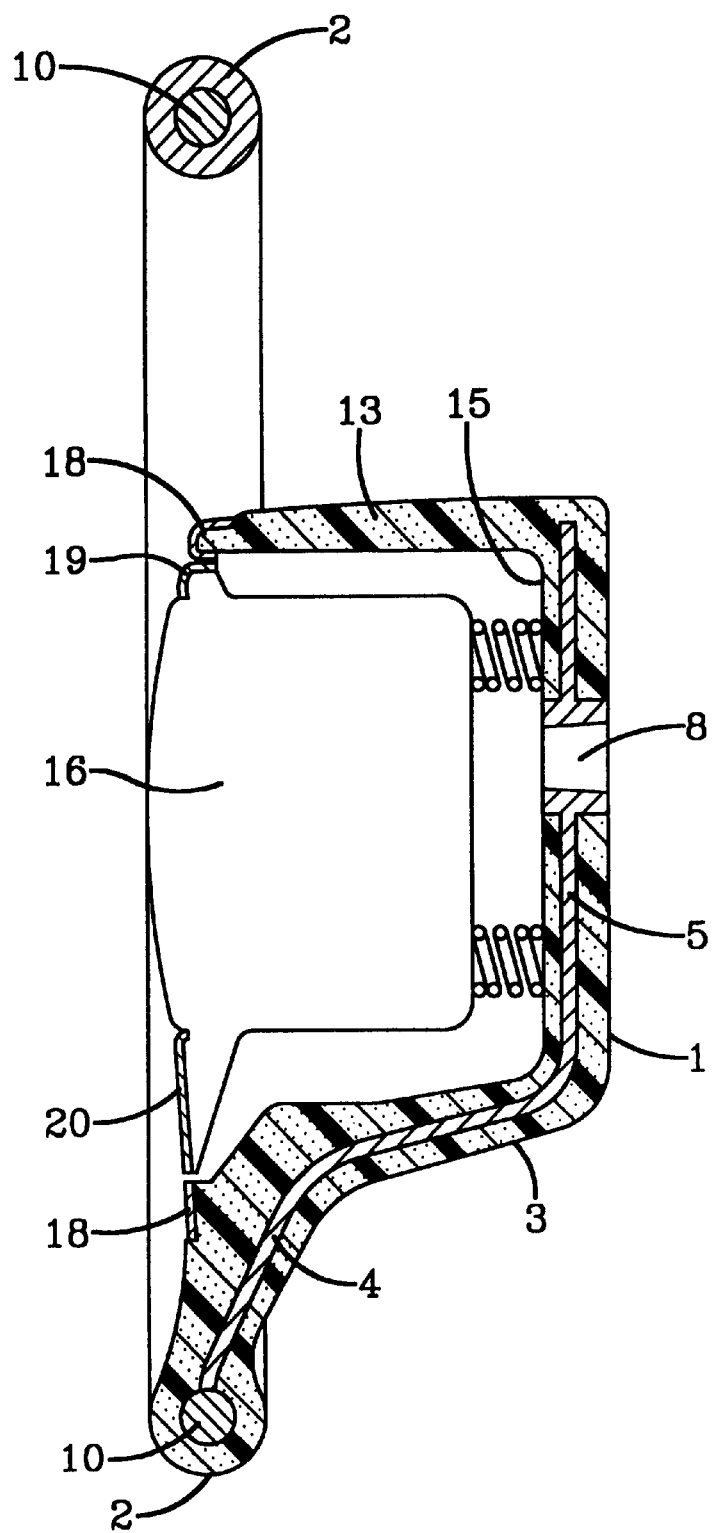

In a variant of the above described embodiment, there is illustrated in FIGS. 3 and 4 an embodiment wherein the metal covering sheet is divided into two separate parts, a first part 18 which covers a short outer portion of the spokes 3 close to their attachment to the ring 2 and the curved projections 13, while a second part 19 of the covering sheet is integral with the module 16 and covers it as a thin circular ring having radial projections 20 overlapping the innermost parts of the spokes 3.

Many changes and modifications in the above described embodiments of the invention can, of course, be carried out without departing from tthescope thereof. Accordingly, that scope is intended to be limited only by the scope of the appended claims.

I claim:

1. A steering wheel comprising a central part for connection to a steering wheel attachment, a cavity housing a module comprising an airbag, an outer ring and a plurality of substantially radial spokes connecting the said outer ring to the said central part of the said steering wheel, said plurality of spokes are covered by a metal sheet integral therewith so as to give the steering wheel a sporting appearance, wherein the metal sheets surrounds the entire perimeter of the central part.

2. The steering wheel according to claim 1, wherein the said metal sheet is aluminum.

3. The steering wheel according to claim 1 wherein the said metal sheet also covers arched projections of the said central part that laterally bound the housing cavity.

4. The steering wheel according to claim 1 further comprising a second metal sheet integral with the module which extends as an outer ring and has radial projections overlapping the spokes.

5. The steering wheel according to claim 2 wherein the said metal sheet also covers arched projections of the said central part that laterally bound the housing cavity.

6. The steering wheel according to claim 2 further comprising a second metal sheet integral with the module which extends as an outer ring and has radial projections overlapping the spokes.

7. The steering wheel according to claim 5, wherein the said second metal sheet is aluminum.

8. The steering wheel according to claim 6, wherein the said second metal sheet is aluminum.

9. A steering wheel comprising a central part for connection to a steering wheel attachment, a cavity housing a module comprising an airbag, an outer ring and a plurality of substantially radial spokes connecting the outer ring to the central part of the steering wheel, the spokes having an outer portion and an inner portion, wherein the spokes are covered by first and second metal sheets, the first metal sheet overlaps the outer portion of the spokes and the second metal sheet is integral with the module and overlaps the inner portion of the spokes, wherein the second metal sheet surrounds the entire perimeter of the central part.

10. A steering wheel comprising a central part for connection to a steering wheel attachment, a cavity housing a module comprising an airbag, an outer ring and a plurality of substantially radial spokes connecting the outer ring to the central part of the steering wheel, wherein the plurality of spokes are covered by a metal sheet integral therewith, the metal sheet extending from the module to a point near the outer ring, wherein the metal sheet surrounds the entire perimeter of the central part.

11. The steering wheel according to claim 10, wherein the metal sheet is aluminum.

12. The steering wheel according to claim 10 wherein the metal sheet also covers arched projections of the central part that laterally bound the housing cavity.

* * * * *